United States Patent Office 3,202,715
Patented Aug. 24, 1965

3,202,715
METHOD OF OXIDIZING MONO-OLEFINS
Joseph T. Kummer, Midland, Mich., assignor to The Dow Chemical Company, Midland, Mich., a corporation of Delaware
No Drawing. Filed Aug. 4, 1960, Ser. No. 47,395
8 Claims. (Cl. 260—586)

The invention is concerned with an improved method of preparing an intermediate non-carboxylic carbonyl compound employing an acyclic mono-olefin. More especially the invention is concerned with the method of preparing acetaldehyde employing ethylene or preparing a ketone employing a mono-olefin having at least 3 carbon atoms.

Methods of converting a mono-olefin to a compound containing a carbonyl group by oxidization are known, for instance: by the oxidation at an elevated temperature of ethylene or propylene to the corresponding glyoxal employing selenium dioxide as the oxidizing agent; by the oxidation at an elevated temperature of butylene or a higher homologue thereof to maleic acid or maleic anhydride employing a solid catalytic oxide or salt of V, Bi, U, W, Cr, Mn, or Mo; by the oxidation at an elevated temperature of propylene to acrolein employing a vaporous mixture of a mono-olefin, oxygen, and selenium metal over a contacting material comprising copper silicate or employing a vaporous mixture of propylene and air over a contacting material comprising tellurium oxide and vanadium oxide. In such known methods there is a tendency for oxidation to be insufficiently controlled or for it to progress further than is desired, resulting in a mixture of oxidation products or in progressing to the formation of some acid or the ultimate oxidation products of $CO_2$ and $H_2O$.

In the preparation of an aldehyde or a ketone by the oxidation of the corresponding mono-olefin, it is desirable that a readily recoverable, substantially pure, single aldehyde or ketone be produced in good yield. In my copending application S.N 3,712, filed January 21, 1960, now U.S. Patent No. 3,133,968, there is described an improved method of preparing an aldehyde or ketone by passing an olefin, alone or together with a substantially inert gas or vapor, such as steam or nitrogen, preferably at a pressure between 50 and 500 p.s.i.g., into or through an acidic aqueous mixture or solution of vanadium compounds, containing at least part of the vanadium in a pentavalent state, while heating the reaction mixture at 100° C. or above, e.g., between 100° and 200° C. and preferably between 120° and 180° C. The aldehyde or ketone formed is removed by known means, e.g., by extraction with a water-immiscible solvent therefor or by vaporization. The remaining aqueous solution or mixture of vanadium compounds from which the aldehyde or ketone has been removed may be reoxidized to provide some pentavalent vanadium, e.g., by passing oxygen or air thereinto and thereafter be re-employed in the production of a further amount of aldehyde or ketone.

Also in my co-pending application, S.N. 47,394, filed concurrently herewith, there is described an improvement over S.N. 3,712, the improvement consisting of providing palladium ions in the aqueous acidic solution containing the pentavalent vanadium ions. In S.N. 47,394 the rate of reaction and the percent aldehyde or ketone produced based upon the mono-olefin consumed is improved and the temperature range at which the reaction may take place may be any temperature between room temperature or lower and about 200° C.

The present invention provides an improvement over that described in S.N. 47,394 and consists essentially of reacting a mono-olefin, having the ethylenic linkage in the acyclic portion thereof, and an acidic aqueous solution or mixture comprising pentavalent vanadium ions, provided therein by admixing at least 0.1 mole of chemically combined vanadium per liter of the aqueous mixture (at least 1 percent thereof being pentavalent) and between 1 and 100 parts by weight per million parts of said aqueous mixture of palladium ions, provided by admixing therewith either palladium metal or a palladium salt or an oxide thereof which is sufficiently soluble in the acidic aqueous mixture to provide the required palladium ions therein, and at least 0.5 percent by weight of the aqueous acidic mixture of a source of copper ions in solution.

An excess of the vanadium compounds, the palladium compounds, or the copper compounds may be present beyond that which will dissolve in the mixture, thereby producing a slurry.

The vanadium ions may be provided by adding a pentavalent compound directly, e.g., $V_2O_5$, or by adding a lower valent vanadium salt such as $VOSO_4$ and, prior to reacting the mono-olefin with the aqueous acidic solution containing the vanadium, oxidizing at least 1 percent and preferably 5 to 10 percent of the lower valent vanadium present to the pentavalent state. Between 1 and 3 moles of $VOSO_4$ are usually employed per liter of the aqueous mixture. (The term mole used herein always means gram mole.)

The palladium may be added either as palladium metal or as a soluble palladium salt or oxide. $PdCl_2$ or $PdSO_4$ are illustrative of palladium salts commonly employed as a source of palladium ions.

The source of copper ions may be metallic copper or a copper salt; copper sulfate or copper acetate are the salts usually employed.

The exact function preformed by the copper is not definitely known. The reaction, $Pd+Cu^{++}$ to yield $Cu+Pd^{++}$, does not go since the free energy is positive. In fact, palladium plates out on a copper wire immersed in a $PdSO_4$ solution. The reaction, $2Cu^{++}+Pd$ to yield $2Cu^{+}+Pd^{++}$, cannot be taking place to any extent since $Cu^+$ does not exist in sulfate solutions and is unstable with respect to Cu and $Cu^{++}$. Although not wishing to be limited by any theory, it is possible that a small amount of Cu may form in the range of a relatively few parts of copper per million of the aqueous mixture, as employed in the invention, to form a CuPd alloy which speeds the resolution of the Pd by the pentavalent vanadium ion. It is quite clear that the oxidizing power provided by the copper is unimportant and that the beneficial effect of the copper is due to more complex phenomona.

Similarly to the inventions described in S.N. 3,712 and in S.N. 47,394, the present invention may be carried out either in a batchwise or continuous operation. In the batchwise mode of operation, the mono-olefin is admixed with the aqueous solution or slurry containing pentavalent vanadium ions, palladium ions, and copper ions, in a reaction zone for a sufficient time for the oxidation of the mono-olefin to be substantially completed and thereafter the resulting aldehyde or ketone thereby produced is recovered from the reaction zone. In a continuous mode of operation a plurality of reaction zones are employed, including one for the oxidation of the mono-olefin and another for the oxidation and reoxidation of lower valent vanadium to the pentavalent state, together with suitable feed and circulating means and suitable recovery and purification means for the aldehyde or ketone being produced. The continuous mode of operation is preferred.

The term "solution" when used herein includes an aqueous acidic slurry or mixture of the vanadium compounds, the metallic palladium or palladium compounds and the copper or soluble copper salts in which a sufficient amount of the compounds of any one of vanadium, palladium, and/or copper goes into solution to yield effective amounts of palladium, copper, and pentavalent vanadium ions for oxidation of the mono-olefin.

Pentavalent vanadium in the aqueous solution may be provided by admixing a pentavalent compound directly, or it may be provided by admixing a lower valent vanadium compound therewith and oxidizing it to the pentavalent state.

The oxidation of an aqueous solution of one or more vanadium compounds having a valence of 4 or lower to a state in which at least a part of the vanadium is pentavalent, can be accomplished in known ways, e.g. by electrolytic oxidation or by treatment with a chemically reactive oxidizing agent. It is conveniently accomplished by passing oxygen gas or a gas containing elemental oxygen into the aqueous lower valent vanadium solution at a pressure of say 50 to 500 p.s.i.g. while heating at temperatures of 100° or higher, e.g., between 100° and 250° C. For satisfactory practice of the invention at least about 1 percent and usually not more than 15 percent of the lower valent vanadium in the solution is oxidized to pentavalent ions.

However, oxidation of lower valent vanadium to the pentavalent state produces hydrogen ions and, therefore, the solution becomes increasingly acidic as oxidation of the lower valent vanadium proceeds. High acidity of the aqueous solution of vanadium compounds retards the oxidation of the lower vanadium compounds.

On the other hand the aqueous solution containing pentavalent vanadium ions, palladium ions, and copper ions must be acidic when the mono-olefin is admixed therewith in the practice of the invention or the vanadium will be substantially all removed from solution by precipitation as insoluble vanadium compounds. At lower concentrations of vanadium compounds in the aqueous solution, e.g. those not over about one molar, the rate at which a mono-olefin is oxidized becomes greater with increasingly higher hydrogen ion concentrations. However, when relatively higher concentrations of vanadium compounds are employed, the increased rate of oxidation of the mono-olefin accompanying an increase in hydrogen ion concentration becomes less pronounced.

A hydrogen ion concentration exists in the practice of the invention, however, wherein both oxidation processes proceed in a satisfactory manner. To attain suitable hydrogen ion concentration, between .05 and 2 moles of $H_2SO_4$ or between .1 and 4 moles of an acid sulfate salt, e.g. $NaHSO_4$ or $KHSO_4$, are added per liter of the aqueous solution or mixture. Otherwise stated, the sulfuric acid or acid sulfate salt is employed in such amount as to add between .1 and 4 moles of ionizable hydrogen. Sulfurous acid, the anhydrides of sulfuric acid or sulfurous acid may be used as the acidifying reagent. An excess of undissolved vanadium compounds, palladium metal or palladium compounds, or copper metal or copper compounds may be present during the oxidation of the mono-olefin. It is advantageous in the practice of the invention to provide an excess of pentavalent vanadium over that which will dissolve in the aqueous mixture (even though a precipitate is thereby formed) because during the subsequent oxidation of the mono-olefin, the precipitate, which had been carried along as a slurry, dissolves and thus provides a relatively large source of pentavalent vanadium ions. The precipitate, however, should not be so heavy that it makes pumping thereof difficult. No advantage results from employing either the palladium or the copper ion source material in an amount greater than slightly over that which will dissolve. The preferred practice of the invention is to maintain as high a concentration of the vanadium ions in solution as possible without the undissolved vanadium compounds producing a slurry of such increased viscosity that problems of satisfactory circulation and agitation arise.

When oxidation of the lower valent vanadium is accomplished by the use of gaseous oxygen, unused oxygen gas is usually swept out of the oxidation chamber by passing steam or an inert gas therethrough. This is not essential, but is chiefly done as a safety precaution against the possibility of an explosion or of undesirable side reactions during subsequent oxidation of the mono-olefin.

Examples of the mono-olefin that can be oxidized by the practice of the present invention to form the corresponding non-acidic carbonyl compound are ethylene, propylene, n-butene-1, n-butene-2, n-pentene-1, n-pentene-2, and isoamylene. Apparently any acyclic mono-olefin can be oxidized in accordance with the invention to form the corresponding aldehyde or ketone in good yield.

In the practice of the invention, the non-carboxylic carbonyl compound, i.e. the aldehyde or ketone, is formed by passing the olefin alone or together with a substantially inert vapor or gas such as argon, steam, or nitrogen, into or through the above described aqueous solution or mixture in a manner similar to that described in S.N. 47,394, except that the aqueous solution or mixture employed in the present invention contains copper or a copper compound in addition to the palladium and the pentavalent vanadium.

The aldehyde or ketone formed in accordance with the invention may be separated from the mixture in known ways, e.g. those employed in U. S. Patent No. 3,133,968 or S.N. 47,394. In practice, it is usually vaporized from the mixture by passing steam or an inert gas or vapor, e.g. an excess of the olefin or nitrogen or the like, through the mixture and condensing or separating it from the effluent gases or vapors. Other ways in which it can be recovered from the reaction mixture will be evident to those skilled in the art. The aldehyde or ketone thus produced can be subsequently purified, as by fractional distillation.

The remaining aqueous solution or mixture containing palladium, copper and vanadium compounds, from which the aldehyde or ketone product has been removed, can be re-oxidized as hereinbefore stated, to convert at least part of the vanadium therein to the pentavalent state. It is then in condition for re-employment in the process for the production of a further amount of the aldehyde or ketone.

The following examples describe a number of ways in which the invention has been practiced but are not to be construed as limiting the scope of the invention. There is also set forth an experimental run which is not in accordance with the invention for the purpose of comparsion.

EXPERIMENTAL RUN FOR COMPARATIVE PURPOSES 25 milligrams of palladium metal were admixed with 250 cc. of a 2 molar $VOSO_4$, 0.25 molar $H_2SO_4$ solution. The solution thus prepared was oxidized for 30 minutes by passing oxygen gas therethrough at a pressure of 55 p.s.i.g., a temperature of 120° C., and at a rate of 100 cc./minute. Ethylene gas, at a pressure of 50 p.s.i.g. and a rate of 250 cc./minute, was then passed into the thus oxidized solution, maintained at a temperature of 100° C. The effluent gas being produced was analyzed and found to consist of acetaldehyde and unreacted ethylene. The rate of production of the acetaldehyde was ascertained and found to be $4.6 \times 10^{-3}$ mole per minute per 250 cc. of solution.

*Example 1*

1 percent copper sulfate by weight was admixed with the 250 cc. of the aqueous acidic solution employed in the experimental run above. The effluent gas produced was analyzed and found again to consist of acetaldehyde and unreacted ethylene. The rate of production of the acetaldehyde was ascertained and found to be $6.8 \times 10^{-3}$ mole per minute 250 cc. of solution.

Example 2

A 2 molar $VOSO_4$, .25 molar $H_2SO_4$ solution containing the 25 milligrams of palladium metal was again prepared but in this instance 10 percent of copper sulfate by weight of the solution was admixed therewith. Oxidation of the lower vanadium ions was carried out as in Example 1 above and thereafter ethylene gas passed therethrough at the same pressure, temperature and rate as employed therein. Acetaldehyde was again produced intermixed with unreacted ethylene gas. The rate of production of the acetaldehyde was ascertained and found to be $5.1 \times 10^{-3}$ mole per minute per 250 cc. of solution.

An evaluation of the experimental run and the examples shows clearly that the presence of copper ions in the solution accelerates the rate of production of the non-carboxylic carbonyl compound without accompanying disadvantages. The examples also indicate that a very small amount of the copper in solution is beneficial and that no apparent improvement results from employing amounts in excess of about 1 percent of a copper salt by weight of the solution. This is borne out by the fact that the rate of production when employing 10 percent copper sulfate in solution was no better than that obtained when employing 1 percent copper sulfate in solution.

Varying the percent of copper sulfate between 1 and 10 percent appears to have a small effect upon the oxidation reaction. As little as .5 percent copper sulfate is satisfactory for the practice of the invention. Copper metal, when employed and therefore added to the sulfuric acid solution, is converted to copper sulfate and gives substantially the same results as when copper sulfate is added directly.

When olefins having from 3 to 6 carbon atoms are employed instead of ethylene as in the above examples, a comparable increase in the yield of a ketone over methods not employing the copper is obtained.

Although the above examples are limited to the employment of $VOSO_4$ as the source of pentavalent vanadium ions and palladium metal as the source of palladium ions, similar improvements in the rate of production of the non-carboxylic carbonyl compound from mono-olefins may be obtained when employing other sources of pentavalent vanadium or of palladium, e.g. palladium acetate or palladium sulfate.

Having described my invention, what I claim and desire to protect by Letters Patent is:

1. In a method of oxidizing acyclic mono-olefins having from 2 to 5 carbon atoms in the acyclic portion thereof to the corresponding carbonyl compounds selected from the class consisting of aldehydes and ketones wherein said mono-olefin is admixed and reacted in a stirred aqueous acidic mixture, containing as the acidic material a compound selected from the class consisting of sulfuric acid, sulfurous acid, anhydrides of such acids, alkali metal acid salts of such acids, and mixtures of such acids, anhydrides, and salts, in an amount sufficient to provide between about 0.1 and 4.0 gram atomic weights of hydrogen per liter of aqueous acidic mixture, and containing vanadium compounds as the oxidizing agent, which aqueous mixture contains an average of at least 0.1 gram atomic weight of vanadium chemically combined in said vanadium compounds per liter of the aqueous mixture and includes at least 1 percent by weight of said vanadium compounds, of at least a partially dissolved pentavalent vanadium compound, selected from the class consisting of vanadium pentoxide and oxidation products of vanadyl sulfate, at a temperature between about room temperature and about 200° C. and at a pressure between atmospheric and about 500 p.s.i., and at least 1 part, per million parts by weight of the mixture, of palladium provided therein by admixture therewith a palladium source selected from the class consisting of metallic palladium and palladium salts and oxides having sufficient solubility at the reaction temperature of the mixture to yield at least said 1 part per million of palladium ions in solution, the improvement which consists essentially of incorporating in said aqueous mixture at least 0.5% based on the weight of said aqueous mixture of a copper ion-yielding substance.

2. The method according to claim 1 wherein said copper ion-yielding substance is selected from the class consisting of copper metal, copper sulfate, and copper acetate.

3. In a method of making acetaldehyde wherein ethylene is oxidized in a stirred aqueous acidic mixture consisting essentially of (a) water, (b) an acidic material selected from the class consisting of sulfuric acid, sulfurous acid, anhydrides of such acids, alkali metal acid salts of such acids, and mixtures of such acids, anhydrides, and salts, in an amount sufficient to provide between about 0.1 and 4.0 gram atomic weights of hydrogen per liter of aqueous mixture, (c) vanadium compounds as the oxidizing agent, in an amount sufficient to provide in said aqueous mixture an average of at least 0.1 gram atomic weight of vanadium chemically combined in said vanadium compounds per liter of the aqueous mixture and includes at least 1 percent, by weight of said vanadium compounds, of at least a partially dissolved pentavalent vanadium compound, selected from the class consisting of vanadium pentoxide and oxidation products of vanadyl sulfate, and having incorporated in said aqueous acidic mixture (d) at least 1 part of palladium per million parts by weight of said mixture, and reacting the resulting mixture with the ethylene at a temperature at least as high as room temperature and at least slightly above atmospheric pressure, the improvement which consists essentially of incorporating in said aqueous mixture (e) at least 0.5%, based on the weight of said aqueous mixture, of a copper ion-yielding substance.

4. The method according to claim 3 wherein said copper ion-yielding substance is selected from the class consisting of copper metal, copper sulfate, and copper acetate.

5. In a method of making a ketone wherein an acyclic mono-olefin having from 3 to 5 carbon atoms in the acyclic portion thereof is oxidized in a stirred aqueous acidic solution consisting essentially of (a) water, (b) an acidic material selected from the class consisting of sulfuric acid, sulfurous acid, anhydrides of such acids, alkali metal acid salts of such acids, and mixtures of such acids, anhydrides, and salts, in an amount sufficient to provide between about 0.1 and 4.0 gram atomic weights of hydrogen per liter of aqueous mixture (c) vanadium compounds as the oxidizing agent, in an amount sufficient to provide in said aqueous mixture an average of at least 0.1 gram atomic weight of vanadium chemically combined in said vanadium compounds per liter of the aqueous mixture, and includes at least 1 percent by weight of said vanadium compounds, of at least a partially dissolved pentavalent compound selected from the class consisting of vanadium pentoxide and oxidation products of vanadyl sulfate, and having incorporated in said aqueous acidic mixture (d) at least 1 part of palladium per million parts by weight of said mixture, and reacting the resulting mixture with said mono-olefin at a temperature at least as high as room temperature and at least slightly above atmospheric pressure, the improvement which consists essentially of incorporating in said aqueous mixture (e) at least 0.5%, based on the weight of said aqueous mixture, of a copper ion-yielding substance.

6. The method according to claim 5 wherein said copper ion-yielding substance is selected from the class consisting of copper metal, copper sulfate and copper acetate.

7. In a method of oxidizing an acyclic mono-olefin containing from 2 to 5 carbon atoms in the acyclic portion thereof to the corresponding carbonyl compound selected from the class consisting of aldehydes and ketones by admixture therewith of an aqueous mixture of at least one vanadium compound, said vanadium being present in an amount sufficient to provide at least 0.1 gram atomic weight of vanadium chemically combined in said vanadium compounds per liter of the aqueous mixture, and includes at least 1 percent, by weight of said vanadium compounds, of at least a partially dissolved pentavalent compound selected from the class consisting of vanadium pentoxide and oxidation products of vanadyl sulfate, and wherein said aqueous mixture containing the thus oxidized vanadium contains an acidifying reagent selected from the class consisting of sulfuric acid, sulfurous acid, anhydrides of such acids and alkali metal acid salts of such acids, and mixtures of such acids, anhydrides, and salts, in an amount sufficient to provide at least 0.1 grams atomic atomic weights of hydrogen per liter of said mixture, and between 5 parts per million parts by weight of the mixture and an amount in excess of that soluble in said mixture, of a palladium ion-yielding substance selected from the class consisting of metallic palladium and salts and oxides of palladium, and reacting the resulting mixture with said mono-olefin at a temperature between room temperature and about 200° C. at a pressure between slightly above atmospheric and about 500 p.s.i., and recovering the carbonyl compound, selected from the class consisting of aldehydes and ketones so produced, the improvement which consists essentially of admixing with said aqueous mixture between 0.5 percent by weight of said aqueous mixture and an amount in excess of that soluble in said mixture, of a copper ion-yielding substance.

8. In a continuous method for the production of an intermediate oxidized hydrocarbon product from an acyclic mono-olefin containing from 2 to 5 carbon atoms in the acyclic portion thereof during which a carbonyl group is formed at the ethylenic.

linkage by repeatedly circulating through a series of zones hereinafter defined, an aqueous mixture of vanadium compounds as the oxidizing agent which aqueous mixture contains an average of at least 0.1 gram atomic weight of vanadium chemically combined in said vanadium compounds per liter of the aqueous mixture and includes at least 1 percent by weight of said vanadium compounds, of at least a partially dissolved pentavalent vanadium compound selected from the class consisting of vanadium pentoxide and oxidation products of vanadyl sulfate, and between 0.05 and 2.0 moles of sulfuric acid per liter of said mixture, and having incorporated in said aqueous mixture a palladium-containing substance in an amount sufficient to provide between 1 and 100 parts, per million of said mixture, of palladium, the improvement which consists essentially of incorporating in said aqueous mixture a catalytic amount of a copper ion-yielding substance and passing the resulting mixture through said series of zones comprising: (1) an oxygen-treating zone wherein said aqueous mixture is contacted, at a temperature between room temperature and 250° C. and at a pressure between about 50 and 500 p.s.i.g., with a gas containing elemental oxygen, whereby at least part of the vanadium is oxidized to the pentavalent state; (2) a gas-stripping zone wherein the aqueous mixture is purged of unconsumed oxygen gas by passage of a chemically inactive gas therethrough; (3) a reaction zone wherein said mono-olefin is admixed with said aqueous mixture at a temperature between about 20° and 200° C. and a pressure of between about 50 and 500 p.s.i.g. to convert one of the carbon-hydrogen groups comprising the ethylenic linkage of said mono-olefin to the carbonyl group; and (4) a volatilization zone wherein the carbonyl-containing compound so formed is vaporized from the aqueous mixture and discharged from the volatilization zone; and concurrently feeding additional oxygen-containing gas into said oxygen-treating zone, the mono-olefin into said reaction zone, and the chemically inactive gas through said gas-stripping zone.

References Cited by the Examiner
UNITED STATES PATENTS

| 1,999,620 | 4/35 | Van Peski et al. | |
| --- | --- | --- | --- |
| 2,197,101 | 4/40 | Eaglesfield | 260—592 |
| 3,080,426 | 5/63 | Kirshenbaum et al. | 260—604 |
| 3,133,968 | 5/64 | Kummer | 260—597 |

OTHER REFERENCES

Chemical Engineering, vol. 66, No. 11, June 1959, pp. 33–35.

Handbook of Chemistry and Physics, 41st ed., 1959–60, pages 1733–1734.

Smidt: Chemistry and Industry, No. 2, January 13, 1962, pages 54–61 (London).

Smidt et al.; German application 1,061,767, printed July 23, 1959 (KL. 12o 7/03).

Smidt et al.: Angewandte Chemie, vol., 71, No. 5, March 1959, pages 176–182.

LEON ZITVER, *Primary Examiner.*

CHARLES B. PARKER, *Examiner.*

UNITED STATES PATENT OFFICE

CERTIFICATE OF CORRECTION

Patent No. 3,202,715

August 24, 1965

Joseph T. Kummer

It is hereby certified that error appears in the above numbered patent requiring correction and that the said Letters Patent should read as corrected below.

Column 4, line 74, for "effiuent" read -- effluent --; column 7, line 15, strike out "provide at least 0.1 grams atomic" and insert instead -- add between 0.1 and 4 gram --; column 8, line 33, for "5/63" read -- 3/63 --.

Signed and sealed this 2nd day of August 1966.

(SEAL)
Attest:

ERNEST W. SWIDER
Attesting Officer

EDWARD J. BRENNER
Commissioner of Patents